June 7, 1949.　　　J. CARROLL　　　2,472,191
ANIMATED CARTOON
Filed Dec. 29, 1945
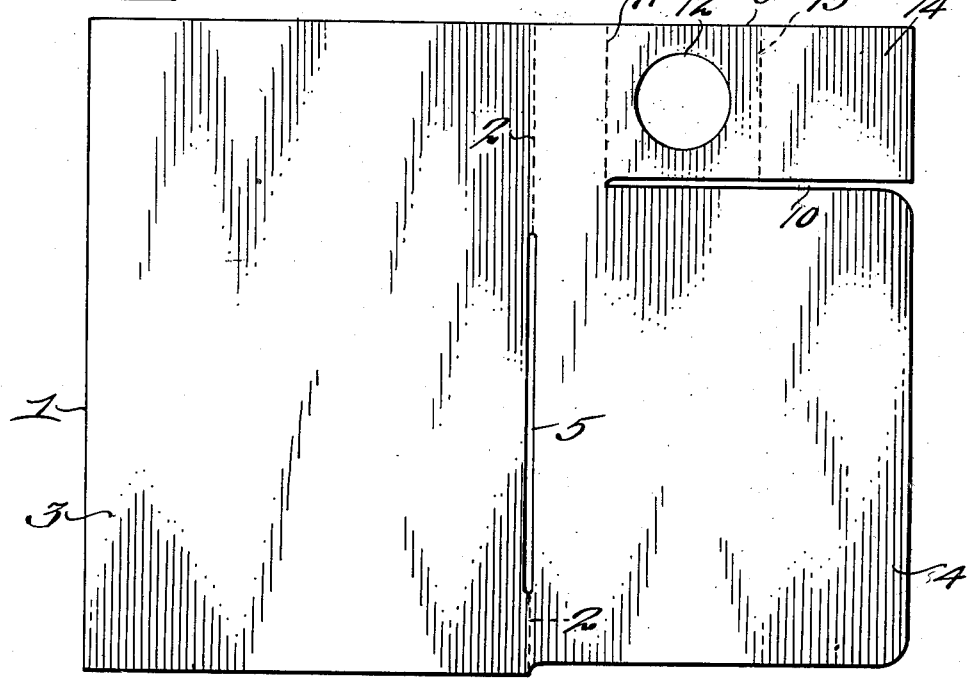
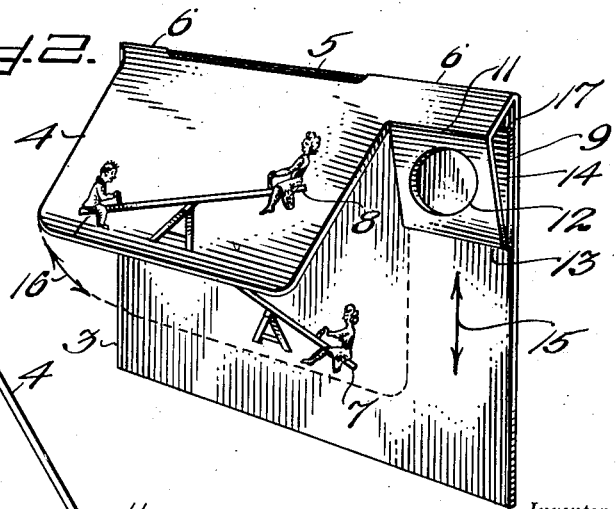
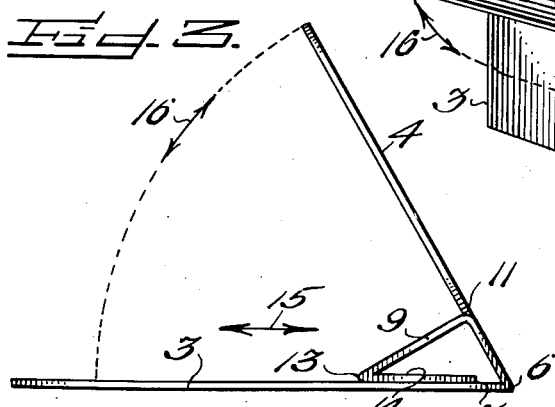
Inventor
James Carroll,
By Clarence A. O'Brien
and Harvey B. Jacobson
Attorneys Patented June 7, 1949

2,472,191

UNITED STATES PATENT OFFICE 2,472,191

ANIMATED CARTOON

James Carroll, Scranton, Pa.

Application December 29, 1945, Serial No. 638,292

2 Claims. (Cl. 46—36)

This invention relates to novel and useful improvements in animated cartoons, and the principal object of the invention is to provide a device of the character herein described, which, when operated, will create the illusion that the various characters illustrated thereon are in motion.

Another object of the invention is to provide an animated cartoon which, depending on the nature of the subject illustrated, may be used for amusement as well as for instructional purposes. In the last-mentioned instance, the invention may be employed to supplement text or instructional lectures by illustrating in an apparently moving form, various simple types of mechanical motion, thus enabling the student to visualize more clearly the operation of the illustrated mechanical elements.

A further object of the invention is to provide a mechanical cartoon which, when not in use, can be folded to assume a flat form, and as such, it may be conveniently mailed in place of greeting cards.

An additional object of the invention is to provide an animated cartoon which may be manufactured easily and integrally from one piece of material, with the minimum amount of waste.

A still further object of the invention is to provide an animated cartoon which does not require complicated adjustment or extensive instruction in order that it may be successfully operated.

With the above more important objects in view, and such other objects as may become apparent as this specification proceeds, the invention consists essentially of the arrangement and construction of parts as illustrated in the accompanying drawings, in which:

Figure 1 is a developed view showing a flat card provided with the necessary perforations and other designating marks, from which the invention is constructed.

Figure 2 illustrates the manner in which the card shown in Figure 1 is folded.

Figure 3 is a perspective view, showing the invention in readiness for operation.

Like characters of reference are used to designate like parts in the specification and throughout the several views.

Referring now to the drawings in detail, the invention comprises a flat card 1, consisting of cardboard or other similar material, and folded along the phantom line 2 to form an underleaf 3 and a cover 4. A medially disposed slot 5 is provided on the line 2, so that the folded edge will assume the form of a pair of spaced hinges 6, having increased flexibility as compared to one hinge of uninterrupted length.

Illustrated on the underleaf 3, is a primary picture 7 showing any suitable object, while a secondary picture 8, showing the same object but in a relatively different posture, is illustrated on the cover 4.

Adjacent to the picture 8 and formed integrally with the card 1 is a reciprocable flap 9, separated from the cover 4 along one side by the slot 10, but flexibly connected to the cover by the creased hinge 11. A suitable aperture 12 is formed in the flap 9 to receive the operator's finger, and the end of the flap is bent under from the creased edge 13 to form a finger rest 14. The latter is slidable upon a marginal area 15 provided adjacent to the picture 7 on the underleaf 3.

When the invention is to be placed in operation, the flat card 1 is folded in the above-described manner so that it assumes the form illustrated in Figure 3. The operator should now place a finger through the aperture 12 onto the finger rest 14, and it will be noted that by moving the finger so as to reciprocate the flap 9 as shown by the arrows 15, the cover 4 will be alternately closed and opened as indicated at 16.

This action is afforded by the spaced relationship of the hinges 6 and 11, which cooperate together in a lever-like manner, and when the cover is fully opened, further movement thereof in the opening direction will be prevented by the end 17 of the finger rest 14 contacting the inside of the hinge 6.

The opening and closing of the cover will expose the pictures 7 and 8 alternately to view, and due to the relatively different posture in which the said pictures are illustrated, an illusion will be produced whereby the characters thereon will appear to be in motion.

It will be noted that for simplicity of manufacture, the entire invention as above described can be made integrally from one piece of cardboard.

While in the foregoing there has been shown and described the preferred embodiment of this invention it is to be understood that minor changes in the details of construction, combination and arrangement of parts may be resorted to without departing from the spirit and scope of the invention as claimed.

What I claim of my invention is:

1. An animated cartoon comprising a card folded to form an underleaf and a cover, the folded edge of said card constituting a hinge, a primary picture on the inner face of said underleaf, a second picture on the outer face of said cover illustrating said primary picture in a relatively different posture, and means for opening and closing said cover to selectively expose said pictures alternately to view, said means including a flap flexibily connected at one edge to said cover in a lever-like relationship to said hinge, said flap having a center portion provided with a finger receiving aperture and an end portion folded under said center portion to form a finger rest, the finger rest sliding on the inner face of said underleaf adjacent the primary picture, the movement of said flap upon said underleaf opening and closing said cover to alternately expose said pictures to view.

2. The combination of claim 1 wherein the end portion of said finger rest engages the inside of said folded edge to limit the sliding movement of said flap in one direction.

JAMES CARROLL.

REFERENCES CITED

The following references are of record in the file of this patent:

UNITED STATES PATENTS

| Number | Name | Date |
|---|---|---|
| 1,419,657 | Akroyd | June 13, 1922 |
| 2,367,967 | Schwartz | Jan. 23, 1945 |
| 2,420,986 | Smith | May 20, 1947 |